US012774425B2

(12) United States Patent
Dahl

(10) Patent No.: US 12,774,425 B2
(45) Date of Patent: Oct. 27, 2026

(54) PROCESS FOR START-UP OF THE HYDRODESULFURIZATION SECTION

(71) Applicant: HALDOR TOPSØE A/S, Kgs. Lyngby (DK)

(72) Inventor: Per Juul Dahl, Vedbæk (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 1115 days.

(21) Appl. No.: 17/054,988

(22) PCT Filed: Jun. 24, 2019

(86) PCT No.: PCT/EP2019/066598
§ 371 (c)(1),
(2) Date: Nov. 12, 2020

(87) PCT Pub. No.: WO2020/002192
PCT Pub. Date: Jan. 2, 2020

(65) Prior Publication Data

US 2021/0324283 A1 Oct. 21, 2021

(30) Foreign Application Priority Data

Jun. 27, 2018 (DK) .......................... PA 2018 00302

(51) Int. Cl.
*C10L 3/10* (2006.01)
*C01B 3/34* (2006.01)

(52) U.S. Cl.
CPC ................ *C10L 3/103* (2013.01); *C01B 3/34* (2013.01); *C01B 2203/0244* (2013.01); *C01B 2203/061* (2013.01); *C01B 2203/068* (2013.01); *C01B 2203/0811* (2013.01); *C01B 2203/127* (2013.01); *C01B 2203/1604* (2013.01); *C10L 2290/06* (2013.01); *C10L 2290/10* (2013.01)

(58) Field of Classification Search
CPC ...... C10L 3/103; C01B 3/34; C01B 2203/127
See application file for complete search history.

(56) References Cited

U.S. PATENT DOCUMENTS

| | | | |
|---|---|---|---|
| 3,642,460 | A | 2/1972 | Thompson |
| 5,324,452 | A | 6/1994 | Allam et al. |
| 7,074,375 | B2 | 7/2006 | Lampert et al. |
| 8,187,366 | B2 | 5/2012 | Yang et al. |
| 9,708,235 | B2 | 7/2017 | Khurram et al. |
| 9,745,526 | B2 | 8/2017 | Vincitore et al. |
| 2002/0015870 | A1 | 2/2002 | Cownden et al. |
| 2015/0110708 | A1 | 4/2015 | Peng et al. |
| 2016/0060553 | A1 | 3/2016 | Khurram et al. |
| 2016/0107963 | A1 | 4/2016 | Khurram et al. |
| 2017/0349435 | A1 | 12/2017 | Ostuni et al. |

FOREIGN PATENT DOCUMENTS

| | | | |
|---|---|---|---|
| CN | 105189343 | A | 12/2015 |
| CN | 105189344 | A | 12/2015 |
| CN | 107074537 | A | 8/2017 |
| DE | 1922181 | A1 | 11/1969 |
| EP | 2609175 | B1 | 1/2018 |
| WO | 03092102 | A1 | 11/2003 |
| WO | 2006095127 | A1 | 9/2006 |

OTHER PUBLICATIONS

Office Action issued on Jun. 6, 2022, by the Intellectual Property India, Government of India in corresponding Indian Patent Application No. 202017054540, and an English Translation of the Office Action. (6 pages).

Office Action issued on Dec. 26, 2022, by the Taiwan Intellectual Property Office in corresponding Taiwanese Patent Application No. 11121265700, and an English Translation of the Office Action. (14 pages).

Danish Patent Search Report dated Jan. 22, 2019.

International Search Report (PCT/ISA/210) issued on Oct. 10, 2019, by the European Patent Office as the International Searching Authority for International Application No. PCT/EP2019/066598.

Written Opinion (PCT/ISA/237) issued on Oct. 10, 2019, by the European Patent Office as the International Searching Authority for International Application No. PCT/EP2019/066598.

Office Action (The First Office Action) issued on Aug. 31, 2021, by the State Intellectual Property Office of the People's Republic of China in corresponding Chinese Patent Application No. 201980039941.7, and an English Translation of the Office Action. (10 pages).

*Primary Examiner* — Sally A Merkling
*Assistant Examiner* — Nicholas A. Piro
(74) *Attorney, Agent, or Firm* — Boone IP Law

(57) ABSTRACT

In a process for the start-up of a hydrodesulfurization section, comprising the steps of providing a natural gas feed, passing the natural gas feed through the waste heat section of a reformer, thereby heating the natural gas feed, and passing the heated natural gas feed through a hydrodesulfurization section, thereby heating the hydrodesulfurization section while producing a desulfurized natural gas stream, a part of the desulfurized natural gas stream is provided as fuel for the reformer, while the remainder of the desulfurized natural gas is recycled to at least one point upstream the waste heat section.

6 Claims, No Drawings

PROCESS FOR START-UP OF THE HYDRODESULFURIZATION SECTION

The present invention relates to a novel process for start-up of a hydrodesulfurization section. In the context of the invention, a "hydrodesulfurization section" can be a part of any industrial plant, e.g. a hydrodesulfurization section with a subsequent natural gas fired reformer and/or natural gas fired heater, such as—but not limited to—ammonia, methanol, hydrogen, syngas or ATR process plants.

Hydrodesulfurization (HDS) is a catalytic chemical process widely used to remove sulfur from natural gas and from refined petroleum products, such as gasoline or petrol, jet fuel, kerosene, diesel fuel and fuel oils. Any sulfur in the hydrocarbon feed is a catalyst poison for most syngas generation processes and for syngas based processes such as the Haber-Bosch ammonia process and the methanol process. Furthermore, the purpose of removing the sulfur, thereby creating products such as ultra-low-sulfur diesel, is to reduce the sulfur dioxide ($SO_2$) emissions that result from using those fuels in automotive vehicles, aircraft, railroad locomotives, ships, gas or oil burning power plants, residential and industrial furnaces, and other forms of fuel combustion.

Various prior art documents deal with hydrodesulfurization procedures. Thus, U.S. Pat. No. 7,074,375 B2 describes a method for desulfurizing a hydrocarbon gas by selective partial oxidation and adsorption. Further, U.S. Pat. No. 8,187,366 B2 describes desulfurizing natural gas by contacting the gas with an adsorbent, and EP 2 609 175 B1 describes a hydrodesulfurization process with a selected liquid recycle to reduce the formation of recombinant mercaptans.

Traditionally, during start-up of a natural gas reforming section comprising a hydrodesulfurization section, once-through heated natural gas (NG) is used. It is also known in the art that heated NG is recycled in a closed loop wherein desulfurized NG is cycled through at least the waste heat section of a reformer (heating the looped NG) and the hydrodesulfurization section. However, this will result in a desulfurization of the catalyst in the hydrogenation part of the hydrodesulfurization section, which will have a negative impact on the efficiency of the hydrogenation once heated.

A normal methanol plant start-up requires around 9 to 14 hours to heat the hydrodesulfurization section to an optimum temperature to activate the hydrodesulfurization catalyst before feeding NG to the reformer for further processing. Since NG is being used for heating and, in the once-through case, is also concurrently being vented to flare, the existing start-up process wastes substantial amounts of NG. This has a negative impact on the environment, and it also reduces the overall efficiency of the plant.

Accordingly, what is needed is a process which efficiently recycles NG rather than venting the NG to the flare system. Recycling of NG until the hydrodesulfurization section reaches the required temperature increases the overall plant efficiency, enhances the production, saves significant amounts of NG and reduces the carbon footprint of the plant. This is the subject of U.S. Pat. No. 9,708,235 B2.

However, the method described in U.S. Pat. No. 9,708,235 B2 has the negative consequence that the hydrogenator catalyst will be desulfurized, which in turn has the consequence that the catalyst loses its ability to hydrogenate. This will inevitably have a negative influence on the running of the plant after heating-up or, alternatively, it will make an addition of sulfur to the hydrogenator necessary.

It has now turned out that this phenomenon can be avoided if a part of the recycle NG is split off and used as fuel in the feed reformer. This is advantageous because sulfur-containing NG is constantly being fed to the heating-up loop and, at the same time, any passage of NG to flare is avoided because part of the desulfurized NG simply replaces sulfur-containing NG fuel to the reformer.

Another advantage of this alternative procedure is that the emission of sulfur is markedly reduced.

In a first aspect of the present invention, a process is provided, by which the desulfurization of the catalyst in the hydrogenation part of the hydrodesulphurization section is avoided.

In a second aspect of the present invention, a process is provided, which limits the sulfur emission through flue gas from the reforming section.

In a third aspect of the present invention, a process is provided, which limits the $CO_2$ emission through flue gas from the reforming section.

These and other advantages are provided by a process for the start-up of a hydrodesulfurization section, comprising the steps of

- providing a natural gas feed,
- passing the natural gas feed through the waste heat section of a reformer, thereby heating the natural gas feed,
- passing the heated natural gas feed through a hydrodesulfurization section, thereby heating the hydrodesulfurization section while producing a desulfurized natural gas stream, and
- providing a part of the desulfurized natural gas stream as fuel for the reformer and recycling the remainder of the desulfurized natural gas to at least one point upstream the waste heat section.

When a part of the desulfurized natural gas is used as fuel for the reformer, a flow of fresh natural gas is required in order to maintain a natural gas flow in the start-up loop. As the fresh natural gas flow contains sulfur, the desulfurization of the dehydrogenation catalyst in the hydrodesulfurization section is avoided. Furthermore, since desulfurized natural gas from the hydrodesulfurization section is used as reformer fuel, the sulfur emission via the flue gas is very limited. Also, as the flue gas contains no sulfur or has a very limited sulfur content, the temperature of the flue gas can be kept lower, thereby reducing the $CO_2$ emission from the reforming section.

Preferably the flow of the natural gas feed is maintained high enough to ensure that desulfurization of the dehydrogenation catalyst in the hydrodesulfurization section is avoided. The flow of the natural gas feed may be varied or remain constant as long as the flow of the natural gas feed during the start-up of the hydrodesulfurization section is high enough to ensure that the hydrogenation catalyst is sulfurized when the desired temperature of the hydrodesulfurization section is achieved. It is especially preferred that the flow of fresh natural gas feed ensures a sulfur average content above 0.05 ppm at the inlet to the hydrogenator.

In preferred embodiments, the start-up process is continued until the temperature of the desulfurized natural gas that is leaving the desulfurizing section (i.e. the temperature of the hydrodesulfurization section) is between 300 and 400° C., typically 360° C., whereupon the remainder of the desulfurized natural gas is provided as feed for the reformer, and the reforming section is started.

The present process for start-up of a hydrodesulfurization section may be used in any plant or in connection with any technology, in which a hydrodesulfurization section is succeeded by a natural gas fired reformer or heater, such as an ammonia, methanol, hydrogen, syngas or ATR plant or process.

Exemplary values for natural gas (NG) flow, sulfur (S) content and temperature of streams in the heating loop are provided in Table 1 below. As can be seen from the numbers, the natural gas leaving the loop as reformer fuel (4) is replenished by fresh natural gas feed (1).

TABLE 1

| | 1 NG feed | 2 NG feed plus recycle | 3 Recycle | 4 Fuel | 5 desulfurized NG to reformer |
|---|---|---|---|---|---|
| NG flow, $Nm^3/h$ | 1500 | 30000 | 28500 | 1500 | 0 |
| S content, ppm | 20 | 1 | 0 | 0 | 0 |
| Temperature, ° C. | 40 | 50 | 300 | 100 | — |

When the flue gas from the reformer has a very low content of sulfur (ideally contains no sulfur at all), then it is possible to operate the reformer with a lower reformer flue gas exit temperature. This means that NG consumption as well as $CO_2$ emission can be reduced.

Among the main differences from what was previously known is the fact that a part of the desulfurized recycle NG stream is used as fuel for the reformer. This way it is made sure that sulfur-containing NG is constantly sent to the hydrogenator, whereby the catalyst is kept active and ready for use all the time.

The invention claimed is:

1. A process for a start-up of a hydrodesulfurization section, comprising the steps of:

providing a natural gas feed comprising sulfur, passing the natural gas feed through a waste heat section of a reformer, thereby heating the natural gas feed, passing the heated natural gas feed through a hydrodesulfurization section comprising a hydrogenator, thereby heating the hydrodesulfurization section while producing a desulfurized natural gas stream, and providing a part of the desulfurized natural gas stream as fuel for the reformer and recycling the remainder of the desulfurized natural gas to at least one point upstream the waste heat section, wherein a flow of fresh natural gas feed comprising sulfur is constantly sent to the hydrogenator, wherein the flow of fresh natural gas feed maintains a sulfur concentration at an inlet to the hydrogenator sufficient to maintain a hydrogenator catalyst of the hydrogenator in a sulfurized state during start-up, thereby avoiding desulfurization of the hydrogenator catalyst.

2. The process according to claim 1, wherein the flow of fresh natural gas feed ensures a sulfur average content above 0.05 ppm at an inlet to the hydrogenator.

3. The process according to claim 2, wherein the start-up process is continued until the temperature of the desulfurized natural gas that is leaving the hydrodesulfurizing section, which is the temperature of the hydrodesulfurization section, is between 30° and 400° C., whereupon the remainder of the desulfurized natural gas is provided as feed for the reformer, and the reforming section is started.

4. The process according to claim 1, wherein the start-up process is continued until the temperature of the desulfurized natural gas that is leaving the hydrodesulfurizing section, which is the temperature of the hydrodesulfurization section, is between 30° and 400° C., whereupon the remainder of the desulfurized natural gas is provided as feed for the reformer, and the reforming section is started.

5. The process of claim 1, wherein sulfur removed in the hydrodesulfurization section is replenished by sulfur contained in the fresh natural gas feed.

6. The process of claim 1, wherein no sulfur is added to the hydrogenator from an external sulfur source separate from the fresh natural gas feed.

* * * * *